United States Patent
Timmons et al.

(10) Patent No.: US 11,343,253 B2
(45) Date of Patent: May 24, 2022

(54) ACCESS CONTROL FOR PRIVATE CHANNELS IN A CHANNEL-BASED DISCUSSION SYSTEM

(71) Applicant: Slack Technologies, Inc., San Francisco, CA (US)

(72) Inventors: Andrew Timmons, San Francisco, CA (US); Carmen Raffa, San Francisco, CA (US); Jonathan Byman, Oakland, CA (US); Ayushi Samaddar, Cupertino, CA (US); Aish Raj Dahal, San Francisco, CA (US); Colin Gibbs, San Francisco, CA (US); Robin McConnell Balaga, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 62 days.

(21) Appl. No.: 16/875,446

(22) Filed: May 15, 2020

(65) Prior Publication Data

US 2021/0359998 A1 Nov. 18, 2021

(51) Int. Cl.
*H04L 29/06* (2006.01)
(52) U.S. Cl.
CPC .......... *H04L 63/101* (2013.01); *H04L 63/104* (2013.01)
(58) Field of Classification Search
CPC ..... H04L 63/101; H04L 63/104; H04L 63/10; H04L 63/102; H04L 63/0884; H04L 63/0892; H04L 63/108; H04L 63/20; H04L 63/065
See application file for complete search history.

(56) References Cited

U.S. PATENT DOCUMENTS

| 2012/0331568 | A1* | 12/2012 | Weinstein | H04L 12/185 726/29 |
| 2018/0197144 | A1* | 7/2018 | Frank | H04L 63/104 |
| 2018/0287982 | A1 | 10/2018 | Draeger et al. | |

OTHER PUBLICATIONS

"Die, Email, Die! A Flickr Cofounder Aims To Cut US All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.
"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

(Continued)

*Primary Examiner* — Edward Zee
(74) *Attorney, Agent, or Firm* — Erise IP, P.A.

(57) ABSTRACT

Methods, media, and systems for a changing a private channel in a channel-based communication system from an "invited-members" mode to a "whitelisted groups" mode. When in a whitelisted-groups mode, the channel administrator can whitelist one or more groups for channel membership. The whitelisted groups may be external groups managed by an identity provider. Based on the whitelisted groups, users cannot be added to the private channel without being a member of one of the whitelisted groups. Users are also automatically removed from the channel if they are no longer in one of the whitelisted groups for any reason.

19 Claims, 5 Drawing Sheets

(56) References Cited

OTHER PUBLICATIONS

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019], Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, at FP10, LexisNexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

\* cited by examiner

ACCESS CONTROL FOR PRIVATE CHANNELS IN A CHANNEL-BASED DISCUSSION SYSTEM

TECHNICAL FIELD

Embodiments of the invention generally relate to access control for private channels in a channel-based communication system and, more particularly, to techniques for limiting access to private channels via group membership.

Traditionally, access to private channels in a channel-based communication system is managed via invitations from current members. Generally, any member of a private channel can invite any user of the channel-based communication system to the private channel, and that new member can, in turn, invite other members of the channel-based communication system. This access-control method has the advantage of ease of use, but also has several drawbacks, particularly for large organizations. First, private-channel members may unintentionally invite the wrong person in situations where multiple users of the channel-based communication system have similar usernames. Second, private-group members may (intentionally or unintentionally) invite communication-system users who are not (or should not be) privy to the information in the private channel.

The natural alternative to allowing any member to invite new users is for a dedicated administrator of each private channel to manage membership of that channel by inviting new members and removing members who should no longer be permitted access. However, this places a significant burden on channel administrators, particularly in the large organizations that require private group access control. As such, what is needed is a technique for controlling access to private channels in a channel-based communication system that does not require manual intervention by a group administrator to add and remove members.

SUMMARY

Embodiments of the invention address the above-described need by leveraging existing user groups to provide access control for private channels in a channel-based communication system. For example, organizations may have user identity management and authentication provided by an identity provider. Such identity providers offer user group management at a large scale. When managing a private group that contains sensitive information requiring access control, a group administrator can switch the private channel from an "invited-members" mode to a "whitelisted groups" mode. When in a whitelisted groups mode, the channel administrator can whitelist one or more identity provider groups for channel membership. Based on the whitelisted groups, users cannot be added to the private channel without being a member of one of the whitelisted groups. Users are automatically removed from the channel if they are no longer in one of the whitelisted groups for any reason.

Embodiments of the invention thus increase the security of private channels by ensuring that only permitted users may be added while reducing the burden on administrators of manually adding and removing users as they are added to or removed from the list of permitted users. Simultaneously, embodiments of the invention improve the technical performance of the channel-based communication system by throttling the rate at which users are added to or removed from channels when changes to the permitted-users list are made that affect large numbers of members.

In a first embodiment, the invention includes one or more non-transitory computer-readable media storing computer-executable instructions that, when executed by a processor, perform a method for controlling access to a private channel in a channel-based communication system, the method comprising the steps of receiving an instruction from a group administrator to determine the membership of a private channel based on whitelisted groups instead of an invited-members list wherein the private channel includes a plurality of existing private-channel users, receiving an indication from the group administrator of one or more whitelisted groups for the private channel, for each existing private-channel user of the plurality of existing private-channel users in the private channel, classifying the existing private-channel user as whitelisted if the existing private-channel user belongs to at least one whitelisted group of the one or more whitelisted groups, and removing the existing private-channel user from the private channel if the existing private-channel user is not classified as whitelisted, and responsive to an attempt to invite a new private-channel user to the private channel, inviting the new private-channel user to the private channel if the new private-channel user belongs to at least one whitelisted group of the one or more whitelisted groups and displaying an error message if the new private-channel user does not belong to at least one whitelisted group of the one or more whitelisted groups.

In a second embodiment, the invention includes a method for controlling access to a private channel in a channel-based communication system, the method comprising the steps of receiving an instruction from a group administrator to determine the membership of a private channel based on whitelisted groups instead of an invited-members list, wherein the private channel includes one or more existing private-channel users, receiving an indication from the group administrator of a plurality of whitelisted groups for the private channel, and for each existing private-channel user of the one or more existing private-channel users in the private channel classifying the existing private-channel user as whitelisted if the existing private-channel user belongs to at least one whitelisted group of the plurality of whitelisted groups and removing the existing private-channel user from the private channel if the existing private-channel user is not classified as whitelisted.

In a third embodiment, the invention includes one or more non-transitory computer-readable media storing computer-executable instructions that, when executed by a processor, perform a method for controlling access to a private channel in a channel-based communication system, the method comprising the steps of receiving, from a client device, an instruction to use whitelisted-group access control for a private channel and a list of whitelisted groups, determining a list of existing members of the private channel, for each existing member of the private channel of the list of existing members of the private channel, determining, from an identity provider server, if the existing member of the private channel belongs to at least one whitelisted group of the list of whitelisted groups, and if the if the existing member of the private channel does not belong to at least one whitelisted group of the list of whitelisted groups, removing the existing member from the private channel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
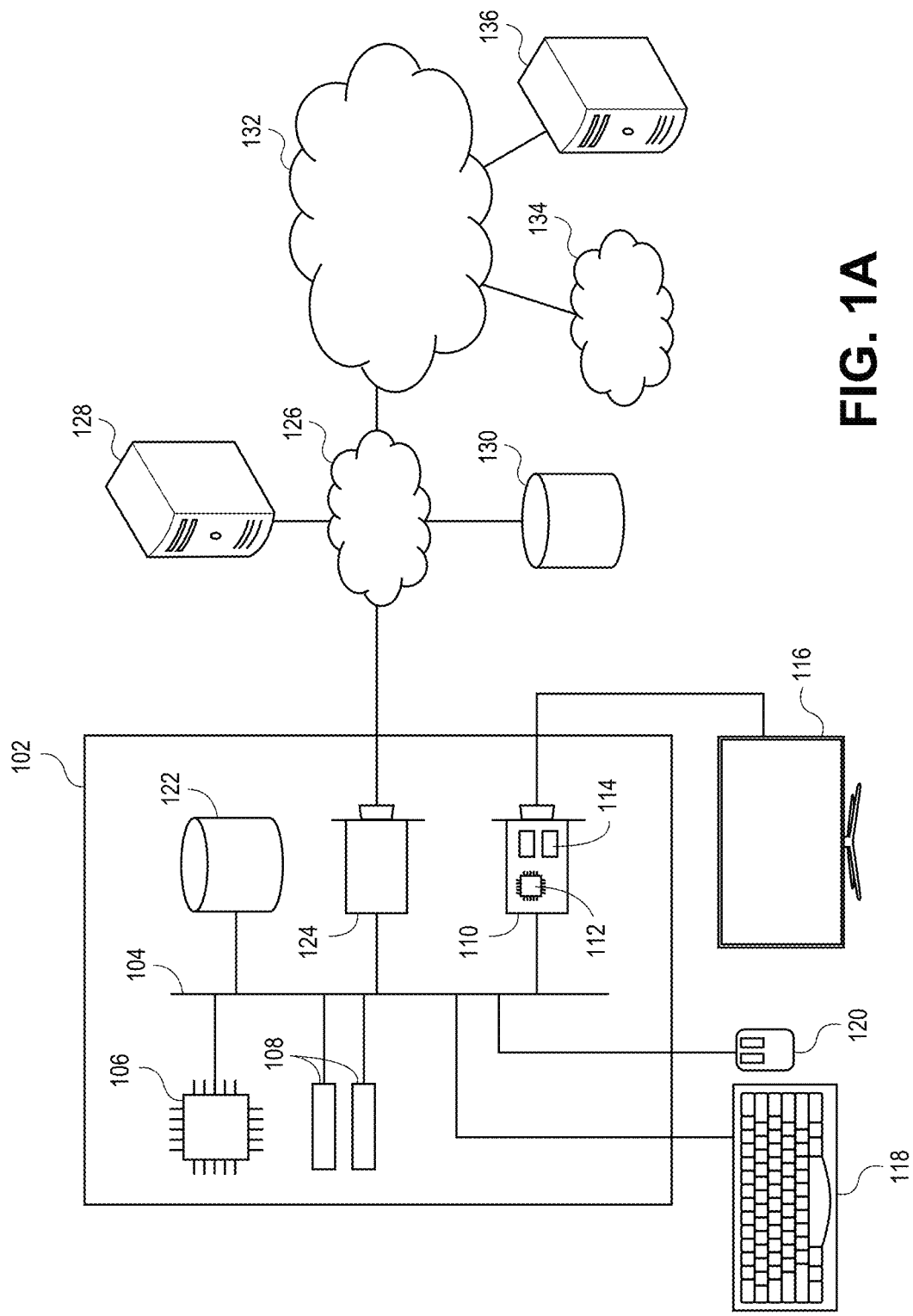
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention leverage group membership, as managed by an identity provider, to provide access control to private channels in a channel-based communication system. In some examples, the channel-based communication system is a channel-based messaging platform. Channel administrators can activate a "whitelisted groups" mode for private channels and specify one or more identity provider groups for the private channel. Once the "whitelisted groups" mode is activated, existing group members who do not belong to any of the whitelisted groups are removed from the private channel, and users of the channel-based communication system cannot be added to the private channel unless they belong to one of the whitelisted identity provider groups.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1A, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

A POSITA will appreciate that this general description of a computing device can be applied to the various components discussed below with respect to (for example) FIG. 1B. Thus, user device 156 might be a smartphone connected to the Internet via a cellular data plan, while channel-based communication system server 158 might be a server computer connected to the Internet via Ethernet and with a locally attached magnetic hard driver storing a SQL database. Similarly, identity provider server 164 might be a virtual machine instance running in the cloud accessing a network-connected identity provider data store in the form of a distributed Bigtable instance.

Figure 1B:
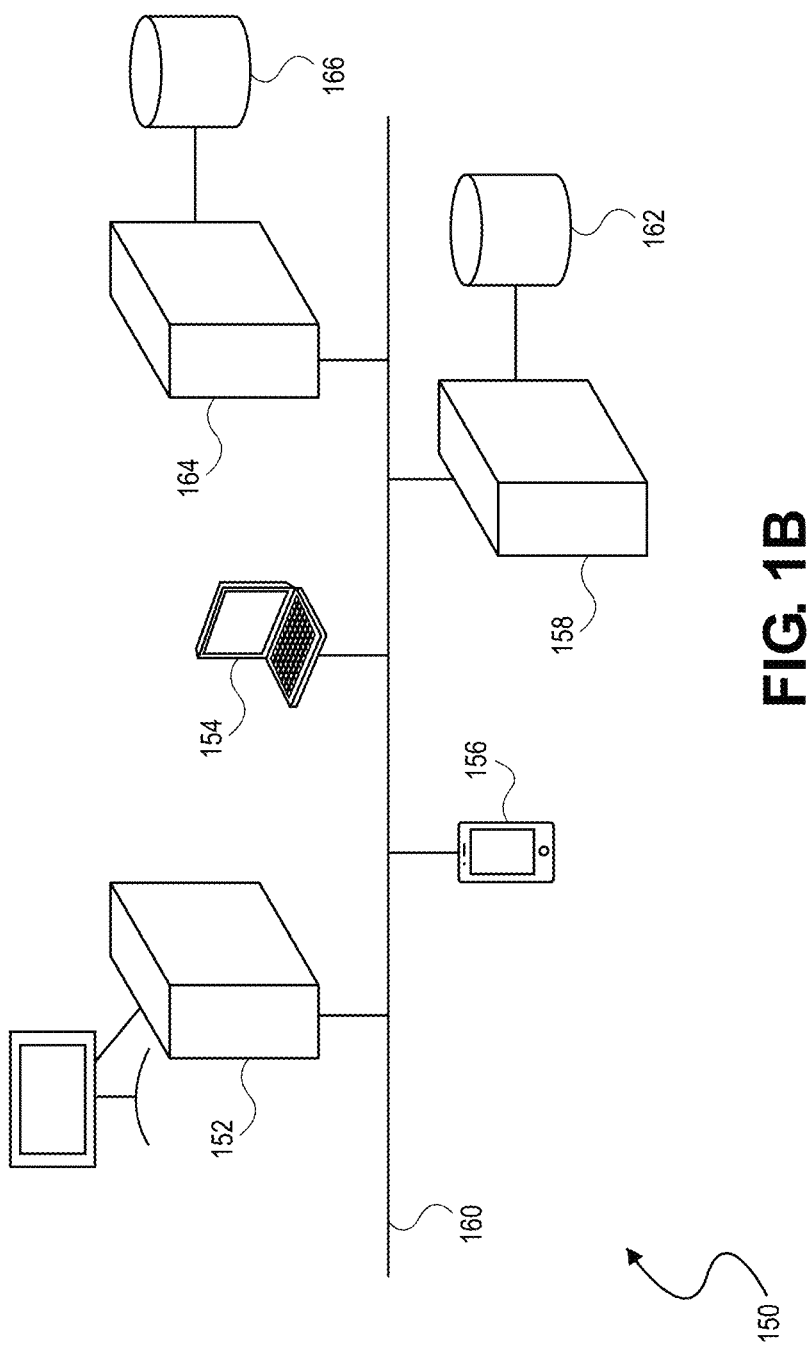
FIG. 1B depicts a system figure illustrating the elements of a system for carrying out embodiments of the invention.

Turning now to FIG. 1B, a system figure illustrating the elements of a system for carrying out embodiments of the invention is depicted and referred to generally by reference numeral 150. System 150 includes any number of client devices such as client device 152, client device 154, and client device 156. As depicted in FIG. 1B, client devices may be any form of computing device discussed above with respect to FIG. 1A. In particular, a user may access the channel-based communication system using a desktop, a laptop, or a mobile device. The user may also switch from one client device to another, and may access the channel-based communication system via multiple devices simultaneously. The channel-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the channel-based communication system is a channel-based messaging platform.

The channel-based communication system is hosted by channel-based communication system server 158. Channel-based communication system server 158 may be a dedicated server, a shared server, a virtual machine instance in a cloud computing environment, or any other form of computing device discussed above with respect to FIG. 1A. Although a single channel-based communication system server 158 is depicted, embodiments with multiple such channel-based communication system servers are also contemplated so as to provide scale, redundancy and/or isolation between different instances of the channel-based communication system. For example, the software development company discussed above may not wish to have its channel-based communications system hosted on the same server as a competitor's channel-based communication system for security reasons. Server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system 150 is contemplated. Channel-based communication system server 158 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Channel data store 162 is communicatively connected to channel-based communication system server 158. As depicted, channel data store 162 is directed connected to channel-based communication system server 158; however, any form of communicative connection (for example, network-attached storage (NAS), a network file system (NFS), or cloud-based storage) can be employed. Broadly speaking, channel data store 162 stores the all of the information used by channel-based communication system server 158. For example, channel data store 162 may store all of the messages with their associated channels, documents and images uploaded to particular channels, channel membership information, and/or user information. In particular, channel data store 162 may store the lists of whitelisted groups for any channels using whitelisted-groups access control and, for embodiments where different user namespaces are used for the channel-based communication system and the identity provider, user identifier mappings between the two namespaces. As previously discussed, multiple channel-based communication system servers may be present in system 150. In such embodiments, each channel-based communication system server may have its own copy of channel data store 162. Alternatively, multiple channel-based communication system servers may share a single network-attached channel data store. Alternatively or in addition, in any of these embodiments, data may be sharded across multiple channel data stores.

Also communicatively coupled to channel-based communication system server 158 is identity provider server 164. As depicted, clients 152, 154, and 156, channel-based communication system server 158 and identity provider server 164 are all attached to the same network. However, embodiments where this is not the case are also contemplated. For example, client 152 and channel-based communication system server 158 may be attached to the same LAN, while client 154 is attached via a VPN and clients 156 and identity provider server 164 are connected via the Internet. Broadly, any combination of forms of communicative coupling is contemplated. In some embodiments, identity provider server 164 may be the same physical server as channel-based communication system server 158.

Communicatively coupled to identity provider server 164 is identity provider data store 166. Identity provider data store 166 stores identity data used for whitelisted-groups access control. Identity provider data store 166 may additionally store other data used in providing identity services, including user identity data, user authentication data, user group data, user permission data and user contact data. As with channel data store 162, identity provider data store 166 may be directly connected to identity provider server 164 or may be connected via any form of network and may be replicated and/or sharded across the network for performance and/or reliability.

Figure 2:
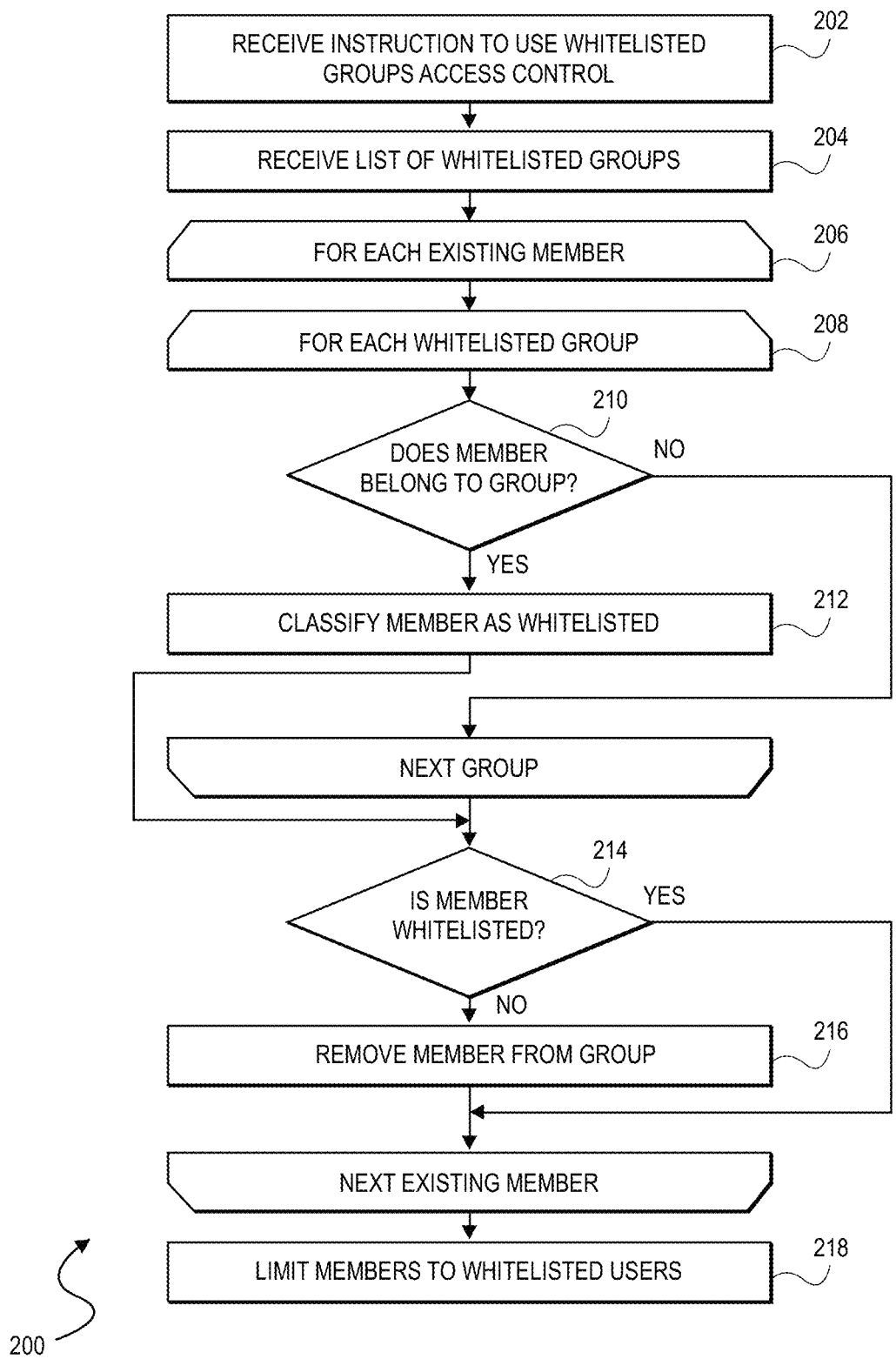
FIG. 2 depicts an exemplary flowchart illustrating the operation of a method in accordance with one embodiment of the invention.

Turning now to FIG. 2, an exemplary flowchart illustrating the operation of a method in accordance with one embodiment of the invention is depicted and referred to generally by reference numeral 200. Method 200 takes place in the context of a channel-based communication system. As used herein, the term "channel-based communication system" refers to a collaborative communication system used within an organization. In some examples, the channel-based communication system is a channel-based messaging platform. Within the collaborative communication system, communication is organized into "channels," each dedicated to a particular topic or set of users. Channels are generally long-lasting, persistent communications of that particular topic or for that particular set of users, rather than the ad hoc, ephemeral conversations of conventional messaging applications. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are persistent and limited to a particular topic or group, users can quickly and easily refer back to previous communications for reference.

In some embodiments, certain channels (referred to herein as "shared channels") may be shared across the channel-based communication systems of multiple organizations such that users belonging to different organizations can collaborate in the same channel. These shared channels may be a part of the channel-based communication system of one organization or the other, distributed between the channel-based communication systems of the two (or more) organizations, or be separate from the channel-based communication systems of the participant organizations. Which system a shared channel is a part of may control, for example, where messages posted in the channel are stored, which organization administers the shared channel, and so forth. In the example above, the software development company may create a shared channel with a vendor providing a subsystem of a product being developed to coordinate development of the subsystem, without giving the vendor access to internal communications of the other aspects of the product.

Broadly speaking, channels may be "public channels" or "private channels." A "public channel" is one to which any user of the channel-based communication system (for example, any employee of the software development company) may subscribe at any time, thereby becoming a "member" of that channel. Examples of such channels include a "water cooler" for general communications unrelated to work and an "announcements" channel where company-wide announcement of general interest can be posted. Of course, a company may make any channel a public channel based on their organizational structure and administration.

By contrast, a private channel is a channel to which access is controlled. Historically, this access control has been performed by requiring that a prospective user of the channel-based communication system be invited to the group by an existing member of the group. This type of access control for a private channel is referred to herein as an "invited-members list," and users of the private channel are referred to as "private-channel users." For example, the product-based channels discussed above may be private channels. When a new developer is added to a product team, an existing member of the product team can invite them to the corresponding private channel. New members of a private channel may be able to view historical messages in the private channel or be limited to viewing only messages posted to the channel after the point at which they were invited to that channel. Embodiments of the invention also involve a novel type of access control for private channels, referred to herein as a "whitelisted-groups" access control, discussed in greater detail below.

Method 200 begins at a step 202, where the system receives an instruction for a particular private channel to begin using whitelisted-groups access control. In some embodiments, this instruction will come from an administrator or the channel (for example, the user who initially created the channel). In other embodiments, the instruction will come from an administrator of the channel-based communication system as a whole (for example, an information technology manager).

In some embodiments, the particular private channel may have existing members. In the example above, for example, the software development company might create a channel for a new product as a public channel or an invited-members private channel to brainstorm a new confidential product and to assemble a development team. Once development of the confidential product begins, the channel may be switched to whitelisted-groups access control so that other employees do not have access to the confidential details of the new product. In other embodiments, the particular private channel may be newly created and have no members or have only the creator-administrator as a member. This might be the case, for example, where management decides to create a new product, but the existence of the product itself should be limited to the assigned development team.

Processing then proceeds to step 204 where the system receives an indication of one or more whitelisted groups for the private channel. In some embodiments, whitelisted groups can be provided for any private channel (or for any public or private channel), with the first indication of a whitelisted group for the channel providing the instruction to begin using whitelisted-groups access control discussed above with respect to step 202. In some embodiments, the instructions of steps 202 and 204 are received via a client of the channel-based communication system. In other embodiments, they are received via a private or public API for the channel-based communication system.

As used in this disclosure, the terms "whitelisting," "whitelisted," and "white list" refer to a default-deny access control policy where permission or access is denied to a user unless the user belongs to a list of users explicitly permitted permission or access (called the "white list"). This stands in contrast to "blacklisting," which refers to a default-allow access control policy where permission or access is granted to a user unless the user belongs to a list of users explicitly forbidden permission or access (called the "blacklist").

For the purposes of this disclosure, the groups that may appear on the whitelist are previously existing groups external to the channel-based communication system, such as those provided by an external identity provider. Broadly speaking, an identity provider is a component or system that creates, maintains, and manages identity information for users and provides authentication services for those user identities. For example, the System for Cross-domain Identity Management (SCIM) is one standard for automating user identity management exchange between different systems. As another example, the Security Assertion Markup Language (SAML) provides a set of profiles for exchanging authentication and authorization information between SAML identity providers and SAML service providers. Alternatively, OpenID Connect provides an identity layer in the OAuth ecosystem. Another example of an identity provider is a Lightweight Directory Access Protocol (LDAP) service. Broadly speaking, any Single Sign-On (SSO) provider or remotely accessible authentication service is contemplated for use as an identity provider. Indications of the list of groups may include a name, numeric, or other identifier that can be subsequently used to ascertain group membership.

Next, processing proceeds to loop 206, which iterates over each existing member of the group being instructed to use whitelisted-groups access control. In some embodiments, this loop may be omitted where the group is a newly created one without any members. In other embodiments, the creator-administrator of the group is automatically added as a member to a newly created group so every group has at least one member. In some embodiments, the list of members in the group being instructed to use whitelisted-groups access control uses the same namespace as the usernames of the groups (as provided, for example, by the identity provider). In other embodiments, the channel uses a different namespace than the groups, and user identifiers must be converted prior to testing group membership.

In some embodiments, loop 206 may iterate through users in batches. For example, if the identity provider supports batch queries, a batch of up to 1000 (or any other number of) users may be queried in a single query rather than querying for each user for each group. Broadly, any strategy that determines which existing group members belong to at least one whitelisted group is contemplated as being within the scope of the invention.

Next, at loop 208, the system iterates over each whitelisted group in the provided list of whitelisted group and tests membership at test 210. The precise manner of testing whether an existing channel member belongs to one of the whitelisted groups can be done in a number of ways, and may depend on the API for determining group membership (as provided, for example, by the identity provider). For example, as shown in FIG. 2, if the API provides a function for testing whether a particular user belongs to a particular group, the system may iterate through the whitelisted groups, testing membership for the existing user, until it is determined that the user belongs to a whitelisted group or the list of whitelisted groups is exhausted without the existing user being a member of any group. Alternatively, if the API provides a function to list the members of a group, the system may request group membership for each whitelisted group, determine the union of the membership lists of all whitelisted groups and locally test whether each existing member is present in the combined list of all whitelisted users. As another alternative, if the API provides a function for listing all the groups to which a particular user belongs, this function can be called for each existing user and the results compared with the list of whitelisted groups to determine where at least one common group exists. In each case, the existing user is classified as whitelisted at step 212 if they belong to any whitelisted group. Otherwise, processing proceeds to the next whitelisted group.

As discussed above with respect to loop 206, group queries may be batched as well, either together with user batching or individually for each user. For example, a single query could be sent to the identity provider for a batch of up to 1000 users determining whether they belong to any of up to 5 (or any other number of) groups. Again, any strategy that determines which existing group members belong to at least one whitelisted group is contemplated as being within the scope of the invention.

Next, processing proceeds to test 214, where after iterating through each whitelisted group, the system tests whether the user has been classified as whitelisted on the basis of belonging to any whitelisted group. If not, the existing user is removed from the group at step 216. Otherwise, if so, processing proceeds to the next existing user in the channel. In some embodiments, non-whitelisted users are removed as they are identified while iterating through the existing members of the groups. However, particularly for large groups that result in the removal of a large number of users, this may result in degraded system performance as resources are dedicated to updating group membership. Accordingly, in some embodiments lists of users to be removed from the group may be accumulated during processing and removed at a throttled rate or channel membership changes otherwise rate limited. For example, user removal requests may be limited no more than 100 users at a time, and issued no more than once per minute.

Alternatively, non-whitelisted users may be removed as they are identified subject to limits on processing resources. For example, user-removal requests may be submitted as non-whitelisted users are identified provided that a job queue associated with user removal does not exceed a predetermined threshold size. If the job queue exceeds that first threshold size, processing may be paused until is the job queue falls below a second threshold (which may be the same or different from the first threshold). In still another embodiment, if the threshold job queue size is exceeded a new process may spawned to accumulate user-removal requests and issue them at a throttled rate so as to keep the job queue below the threshold size. Other techniques for reducing the impact of large channel-membership changes on system performance are also contemplated.

Once the process of iterating through all existing users via loop 206 has been completed and all users not classified as whitelisted have been removed from a group, the channel has been converted to whitelisted-groups access control. This mode can be maintained after conversion is complete by, for example, periodically repeating steps 206 through 216 to ensure that all channel members belong to one of the whitelisted groups. This may be needed, for example, to ensure that users who are removed from identity provider groups are also removed from channels to which they should no longer have access. At step 218, new users, when added to the channel, are limited to only users who belong to one of the whitelisted groups. This process is further detail with respect to method 300 below.

When a channel is using whitelisted-groups access control, the list of whitelisted groups may be changed (for example, by the creator-administrator of the channel). When new groups are added to the list of whitelisted groups, no additional processing may be required. In some embodiments, if groups are removed from the list of whitelisted groups, the system may immediately re-execute steps 206 through 216 to remove users who no longer belong to any group in the updated list of whitelisted groups. In other embodiments, such users are removed as a part of the regular maintenance described above. Similarly, the membership of the whitelisted groups might change. When this occurs, the identity provider may notify the channel-based communication system (for example, via a push notification) and the system can automatically re-execute steps 206 through 216 to ensure that only users who are still whitelisted remain in the channel. Alternatively, the system may periodically (for example, nightly or during "down" time for the system) re-execute steps 206 through 216 to catch updates to whitelisted group membership and/or failed user removals. To effectuate manual updates, the administrator of the group (or, in some embodiments, any member of the group) can list the whitelisted groups to compare them to a list of updated groups. In some embodiments, the administrators of a channel may be controlled by membership in a particular identity provider group, such that any member of that identity provider group in a particular channel can perform administrative functions in that channel. In some such embodiments, role management may be more granular, such that particular administrative functions can be performed by members of corresponding identity provider groups.

In some embodiments, when the last group is removed from the list of whitelisted groups, the channel is converted back to invited-member access control. In some such embodiments, existing channel members (i.e., those in the last group) are not removed from the channel when an update to the list of whitelisted groups automatically converts a channel from whitelisted-groups access control to invited-members access control. In other such embodiments, all members (or in some embodiments, all members except the creator-administrator of the channel) are removed from the channel before converting it to invited-members access control. In embodiments where removing the last group from the list of whitelisted groups does not convert the channel to invited-members access control, the group may remain empty (or include only the creator-administrator) until new groups are added to the list of whitelisted groups and new members added. In other embodiments, an attempt to remove the last group from the list of whitelisted groups may result in an error and require either that some group be added to the list of whitelisted groups or that the channel be manually converted back to invited-members access control.

Considering the operation of method 200 in the context of the example above, the software development company might be developing a new product. To brainstorm new ideas for the product, the development lead might create a new private channel dedicated to the product to which any employee of the company can be invited to contribute ideas. Once the product planning is complete, the product lead might then instruct the system to convert the channel to use whitelisted-groups access control (step 202) in order to prevent product details from leaking. The product lead might then specify a "development team" group, a "product leads" group, and a "management" group previously defined by the identity provider to be the whitelisted groups for the channel (step 204). Once the complete list of whitelisted groups is complete, the system iterates through the all of the members of the group who were invited during the brainstorming phase (loop 206). For each existing member, the system tests whether the member belong to the "development team" group, the "project leads" group, or the "management" group (loop 208 and test 210) and, if so, classifies them as whitelisted (step 212). If the member belongs to one or more of these groups (test 214), they have been classified as whitelisted and remain in the group. If the member does not belong to any of these groups, they are removed from the group (step 216).

Figure 3:
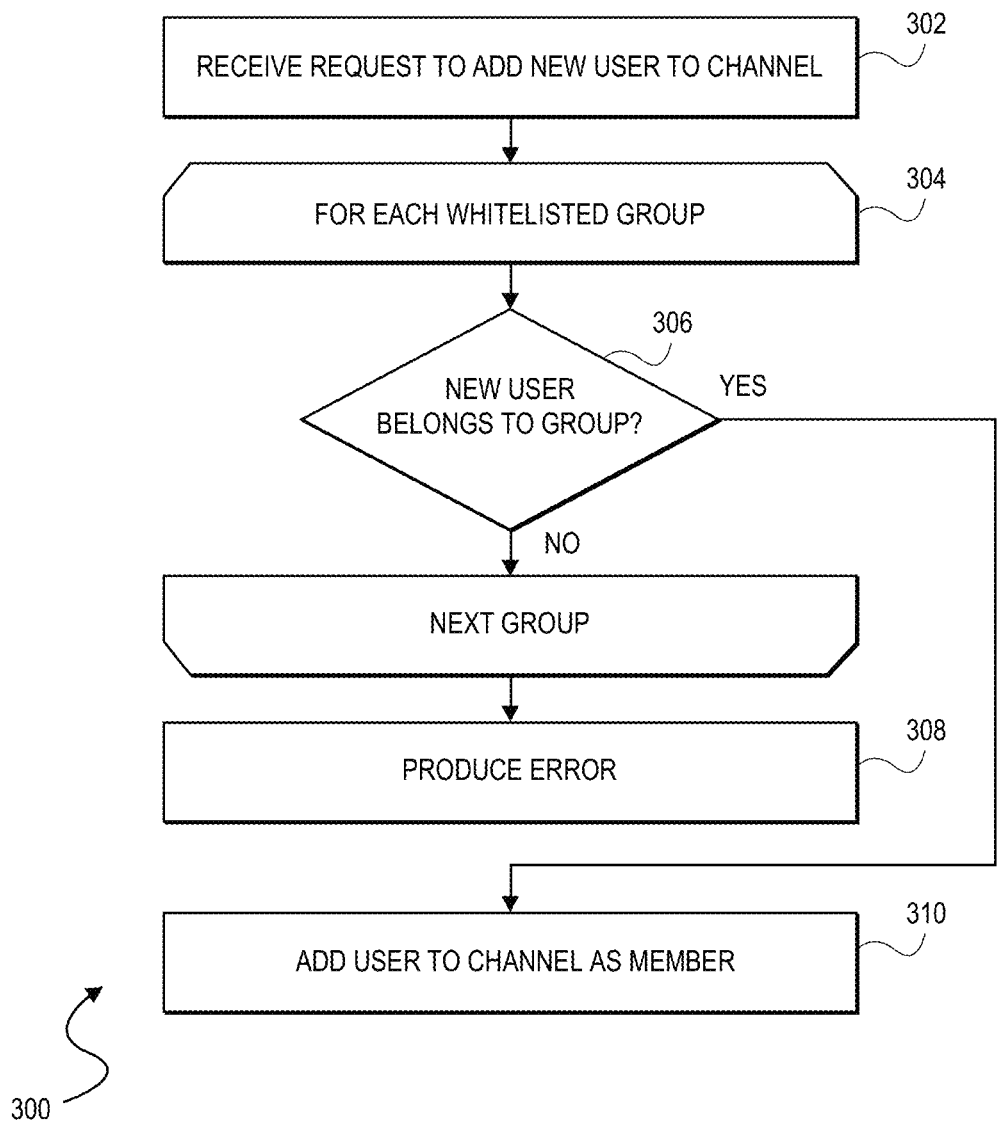
FIG. 3 depicts a flowchart illustrating the operation of a method for adding a new member to a channel using whitelisted groups access control.

Turning now to FIG. 3, a flowchart illustrating the operation of a method for adding a new user to a channel using whitelisted-groups access control is depicted and referred to generally by reference numeral 300. The method begins at step 302, when a request is received to add a user to a channel using whitelisted-groups access control. In some embodiments, only the administrator (or one of the administrators) of a channel using whitelisted-groups access control can attempt to add new users to the channel. In other embodiments, as in a channel using invited-members access control, any member of the channel can attempt to add a new user to the channel. In still other embodiments, the ability to invite members to the channel is controlled by a particular identity provider group, such that only the members of that identity provider group can invite a new user to the channel. As described above with respect to method 200, the request to add the user may include a user identifier in the namespace of the channel-based communication system, which may be the same as the namespace of the identity provider or may be a different namespace, requiring that the user identifier be converted to an identifier in the namespace of the identity provider prior to testing group membership. The request may also include a channel identifier, or take place in the context of a channel, effectively identifying the group to which the new user should be added.

Next, processing proceeds to loop 304, which iterates though each group in the list of whitelisted groups for the identified channel. As described above with respect to loop 208, this test can be performed differently depending upon the API provided by the identity provider, and any of the techniques discussed with respect to loop 208 can also be utilized for loop 304. In some embodiments, different techniques may be used. For example, when adding a single user, it may be more efficient to query the identity provider individually whether the user belongs to each whitelisted group. By contrast, when converting a group with a thousand members to whitelisted-groups access control, it may be more efficient to request the membership of each whitelisted group and locally determine group membership for the thousand members.

For each whitelisted group, the system tests whether the new user belongs to that whitelisted group at test 306. If so, loop 304 can exit and proceed directly to step 310; otherwise loop 304 repeats for the next whitelisted group. In some embodiments, a flag may be set depending on test 306 and processing may continue to the next group regardless of the result of test 306. At step 308, loop 306 has terminated without locating a group to which the new member belongs. As such, the new user cannot be added to the channel and an error message is produced and displayed to the administrator (or existing channel member) attempting to add the new user to the identified channel. In some embodiments, the error message may indicate the whitelisted groups for the channel so that the user can be added to the appropriate group if desired. Method 300 may terminate at this point or provide an option to retry so that, once the user has been added to the appropriate group, they can be easily be added to the channel.

Alternatively, at step 310, it has been determined that the new user belongs to at least one whitelisted group, and the user can be added as a member to the identified channel. In some embodiments, a success message may be generated and provided to the administrator (or existing member) adding the new user to the channel.

Continuing the example above, the project lead wishes to add a developer hired to work on the new product to the channel. The product lead attempts to add the new developer to the channel as with any private channel (step 302). The system receives the identity of the new developer and the channel and iterates through the whitelisted groups for the identified channel (step 304). First, the system tests whether the new developer belongs to the "development team" group (test 306). However, because the developer is newly hired, they have not yet been added to the "development team" group in the identity provider data store. As such, the system proceeds to test the next group. However, the new developer is not a product lead or a manager either, so those tests fail as well. As such, the attempt to add the new developer to the channel fails and an error message is displayed (step 308). Seeing this error, the product lead adds the new developer to the "development team" group and again attempts to add them to the channel. This time, when processing the "development team" group, the system determines that the new developer does belong to the group (test 306), and adds the new developer to the channel (step 310).

Figure 4:
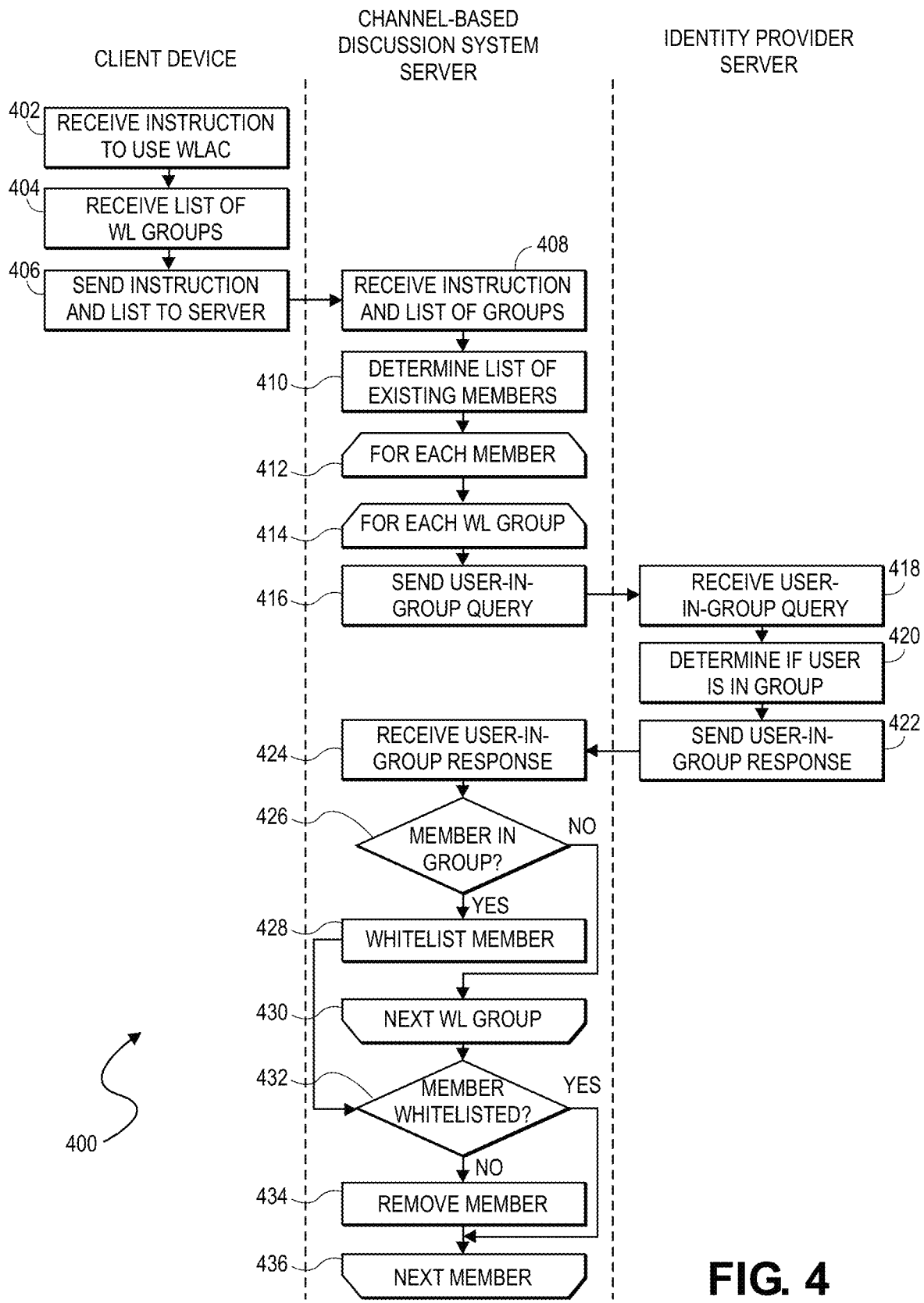
FIG. 4 depicts a swim lane diagram illustrating the component responsibility flow of a process in accordance with embodiments of the invention.

Turning now to FIG. 4, a swim lane diagram illustrating the component responsibility flow of a process in accordance with embodiments of the invention is depicted and referred to generally by reference numeral 400. The process begins at step 402 with the client device (such as client device 152, 154, or 156) receiving an instruction from a user (for example, a channel administrator or creator) that a particular channel should use whitelisted-groups access control. Next, at step 404, the client device receives a list of one or more whitelisted groups from the user. At step 406, the client device sends the instruction and list of groups (in one message or a plurality of messages) to the server. The instruction message may be sent to the server before the list of groups is received or vice versa.

The process continues at the channel-based communication system server (such as channel-based communication system server 158), which receives the instruction and list of groups from the client device at step 408. Next, at step 410, the channel-based communication system server determines a list of existing members of the channel and, at loop 412, iterates through each existing member of the indicated channel. For each member of the channel, the channel-based communication system server iterates through each group of the list of whitelisted groups at loop 414. Inside loop 416, channel-based communication system server generates a query to determine whether the member belongs to the group and sends the query to the identity provider server, converting the user identifier to the namespace of the identity provider if necessary.

Processing now passes to the identity provider server (such as identity provider server 164). At step 418, the identity provider server receives the query including information indicative of the user corresponding to the existing channel member and the group. At step 420, the identity provider server determines whether the user belongs to the group and, at step 422, sends a response indicative of whether the user belongs to the group back to the channel-based communication system server at step 422.

The process now continues back at the channel-based communication system server where the response is received by the channel-based communication system server at step 424. Next, test 426 determines whether the existing member belongs to the group. If so, the member is classified as whitelisted at step 428 and processing breaks out of loop 414 and proceeds directly to test 432. Otherwise, processing proceeds to the next whitelisted group at loop end 430. Next, at test 432, the channel-based communication system server determines whether the group member has been classified as whitelisted. If not, the member is removed from the group at step 434. Otherwise, or after step 434, the channel-based communication system proceeds to the next existing member of the channel at loop end 436.

A person skilled in the art will appreciate that the description of process 400 above utilizes a nested-loop group membership test with only a user-in-group API call to the identity provider server. This structure has been provided for simplicity of description and a person skilled in the art will appreciate that determining whether each existing user belongs to any of the whitelisted groups can be performed in a variety of ways, with the optimal method potentially depending on the number of existing members, the number of whitelisted groups, the number of groups to which each user belongs, and the number of users who are ultimately whitelisted.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. One or more non-transitory computer-readable media storing computer-executable instructions that, when executed by a processor, perform a method for controlling access to a private channel in a channel-based communication system, the method comprising the steps of:
  receiving an instruction from a group administrator to determine the membership of the private channel based on one or more whitelisted groups instead of an invited-members list,
  wherein the private channel includes a plurality of existing private-channel users;
  receiving an indication from the group administrator of the one or more whitelisted groups for the private channel;
  for each existing private-channel user of the plurality of existing private-channel users in the private channel:
    classifying the existing private-channel user as whitelisted if the existing private-channel user belongs to at least one whitelisted group of the one or more whitelisted groups; and
    removing the existing private-channel user from the private channel if the existing private-channel user is not classified as whitelisted; and
  responsive to an attempt to invite a new private-channel user to the private channel:

inviting the new private-channel user to the private channel if the new private-channel user belongs to at least one whitelisted group of the one or more whitelisted groups; and displaying an error message if the new private-channel user does not belong to at least one whitelisted group of the one or more whitelisted groups.

2. The computer-readable media of claim 1, wherein the one or more whitelisted groups for the private channel is a plurality of whitelisted groups for the private channel.

3. The computer-readable media of claim 1, wherein the step of classifying the existing private-channel user as whitelisted if the existing private-channel user belongs to at least one whitelisted group of the one or more whitelisted groups comprises sub-steps of:

sending a query to an identity provider including information indicative of an identity of the existing private-channel user and information indicative of a group of the one or more whitelisted groups; and receiving a response from the identity provider indicating whether the existing private-channel user belongs to the group of the one or more whitelisted groups.

4. The computer-readable media of claim 1, wherein the method further comprises the steps of:

receiving an indication that a membership of at least one whitelisted group of the one or more whitelisted groups has changed; and for each whitelisted private-channel user of the plurality of whitelisted private-channel users in the private channel:

reclassifying the whitelisted private-channel user as still whitelisted if the whitelisted private-channel user belongs to at least one whitelisted group of the one or more whitelisted groups based on the changed membership; and removing the whitelisted private-channel user from the private channel if the whitelisted private-channel user is not classified as still whitelisted.

5. The computer-readable media of claim 1, wherein the instruction and the indication are received via an API for the channel-based communication system.

6. The computer-readable media of claim 1, wherein the step of removing the existing private-channel user from the private channel if the existing private-channel user is not classified as whitelisted is performed at a throttled rate.

7. The computer-readable media of claim 1, wherein the method further comprises the step of verifying that the group administrator is permitted to provide the instruction by verifying that the group administrator belongs to a particular identity provider group.

8. A method for controlling access to a private channel in a channel-based communication system, the method comprising the steps of:

receiving an instruction from a group administrator to determine the membership of the private channel based on one or more whitelisted groups instead of an invited-members list;

wherein the private channel includes one or more existing private-channel users;

receiving an indication from the group administrator of the one or more whitelisted groups for the private channel; and for each existing private-channel user of the one or more existing private-channel users in the private channel:

classifying the existing private-channel user as whitelisted if the existing private-channel user belongs to at least one whitelisted group of the one or more whitelisted groups;

removing the existing private-channel user from the private channel if the existing private-channel user is not classified as whitelisted;

responsive to an attempt to invite a new private-channel user to the private channel:

inviting the new private-channel user to the private channel if the new private-channel user belongs to at least one whitelisted group of the one or more whitelisted groups; and displaying an error message if the new private-channel user does not belong to at least one whitelisted group of the one or more of whitelisted groups.

9. The method of claim 8, wherein the instruction is received via a user interface of the channel-based communication system.

10. The method of claim 8, further comprising the steps of:

receiving an indication that a membership of at least one whitelisted group of the one or more whitelisted groups has changed; and for each whitelisted private-channel user of the whitelisted private-channel users in the private channel:

reclassifying the whitelisted private-channel user as still whitelisted if the whitelisted private-channel user belongs to at least one whitelisted group of the one or more whitelisted groups based on the changed membership; and removing the whitelisted private-channel user from the private channel if the whitelisted private-channel user is not classified as still whitelisted.

11. The method of claim 10, wherein the indication that the membership of the at least one whitelisted group of the one or more whitelisted groups has changed is a notification from an identity provider.

12. The method of claim 8, wherein the step of removing the existing private-channel user from the private channel if the existing private-channel user is not classified as whitelisted is performed at a throttled rate.

13. One or more non-transitory computer-readable media storing computer-executable instructions that, when executed by a processor, perform a method for controlling access to a private channel in a channel-based communication system, the method comprising the steps of:

receiving, from a client device, an instruction to use whitelisted-group access control for the private channel and a list of whitelisted groups;

determining a list of existing members of the private channel;

for each existing member of the private channel of the list of existing members of the private channel:

determining, from an identity provider server, if the existing member of the private channel belongs to at least one whitelisted group of the list of whitelisted groups;

if the existing member of the private channel does not belong to at least one whitelisted group of the list of whitelisted groups, removing the existing member from the private channel;

responsive to an attempt to invite a new private-channel user to the private channel:

inviting the new private-channel user to the private channel if the new private-channel user belongs to at least one whitelisted group of the list of whitelisted groups; and displaying an error message if the new private-channel user does not belong to at least one whitelisted group of the list of whitelisted groups.

14. The media of claim 13, wherein the step of determining, from an identity provider server, if the existing member of the private channel belongs to at least one whitelisted group of the list of whitelisted groups comprises sub-steps of:
for each whitelisted group of the list of whitelisted groups:
sending, to the identity provider server, a query including an indication of the existing member and an indication of the whitelisted group; and
receiving, from the identity provider server, a response indicating whether the existing user belong to the whitelisted group;
returning an indication that the existing member belongs to at least one whitelisted group if at least one positive response was received; and
returning an indication that the existing member does not belong to at least one whitelisted group if no positive responses were received.

15. The media of claim 13, wherein the step of determining, from an identity provider server, if the existing member of the private channel belongs to at least one whitelisted group of the list of whitelisted groups comprises sub-steps of:
for each whitelisted group of the list of whitelisted groups:
sending, to the identity provider server, a query including an indication of the whitelisted group;
receiving, from the identity provider server, a list of members of the whitelist group;
comparing the existing member to the received list of members of the group;
returning an indication that the existing member belongs to at least one whitelisted group if the existing member is included in the received list of members of the group; and
returning an indication that the existing member does not belong to at least one whitelisted group if, after the existing member has been compared to each whitelisted group of the list of whitelisted groups, the existing member was not included in at least one received list of group members.

16. The media of claim 13, wherein the step of determining, from an identity provider server, if the existing member of the private channel belongs to at least one whitelisted group of the list of whitelisted groups comprises sub-steps of: sending, to the identity provider server, a query including an indication of the existing member and an indication of each whitelisted group of the list of whitelisted groups;
receiving, from the identity provider server, a response indicating whether the existing member belongs to at least one whitelisted group of the list of whitelisted groups;
in response to a determination the response is positive, returning an indication that the existing member belongs to at least one whitelist group; and
in response to a determination the response is negative, returning an indication that the existing member does not belong to at least one whitelisted group.

17. The media of claim 13, wherein the step of removing the existing member from the private channel is performed at a throttled rate.

18. The media of claim 13, wherein the method further comprises the step of verifying that the instruction was received by the client device from an administrator of the private channel.

19. The media of claim 18, wherein the step of verifying that the instruction was received by the client device from a channel administrator of the private channel is performed by determining, from the identity provider server, whether a user identifier associated with the instruction belongs to an administrative group associated with the private channel.

* * * * *